EARLY TIME RADIO FLASH PULSE FORM

MOST PROBABLE FORM
1ST RETURN STROKE
SUBSEQUENT STROKE

K PULSES
MOST PROBABLE FORM

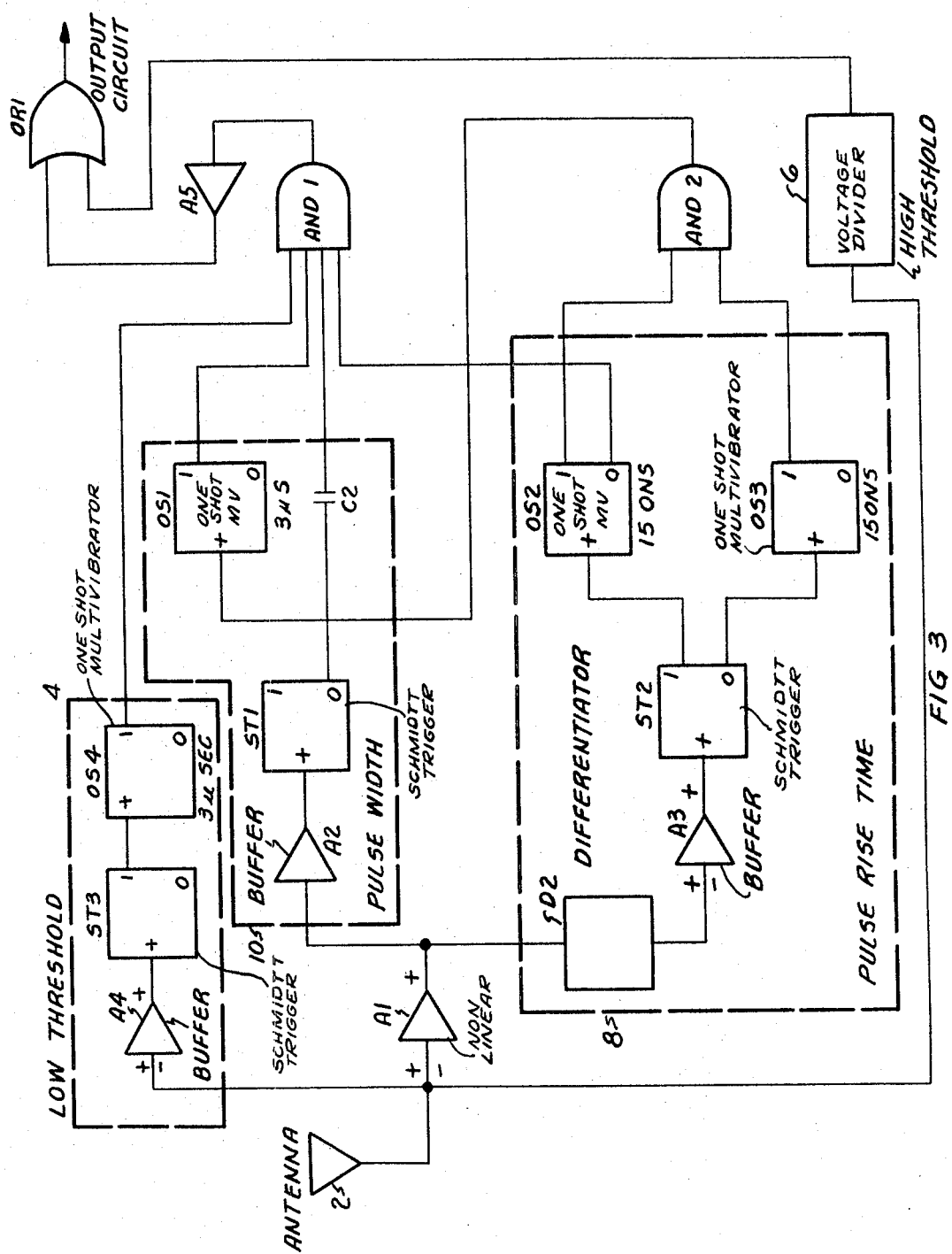

TIMING DIAGRAM
SHORT RANGE
DETECTION SYSTEM

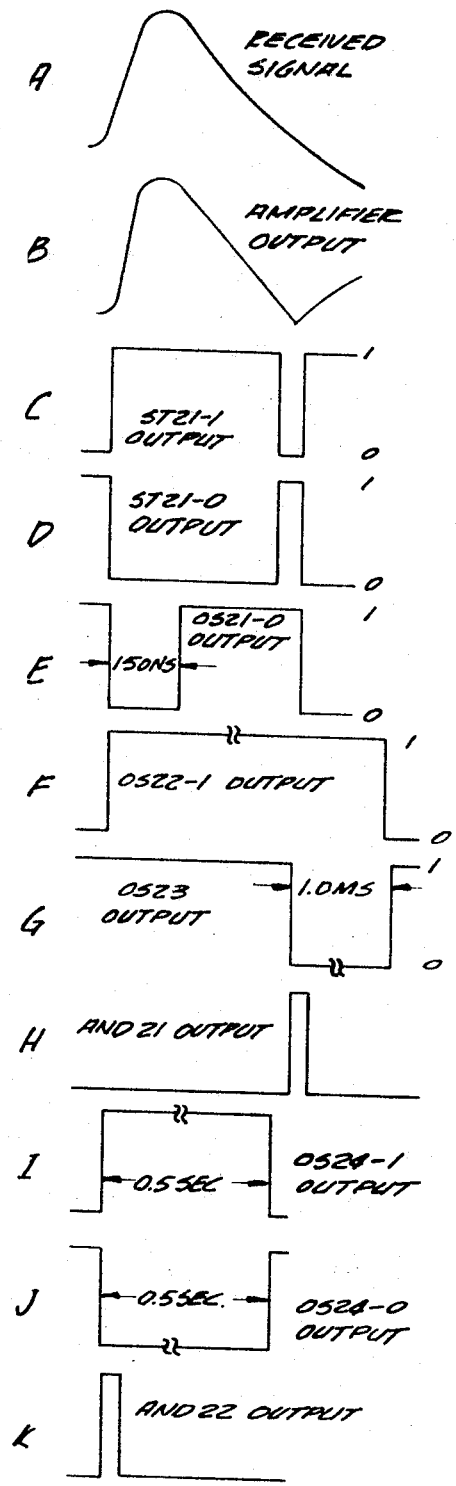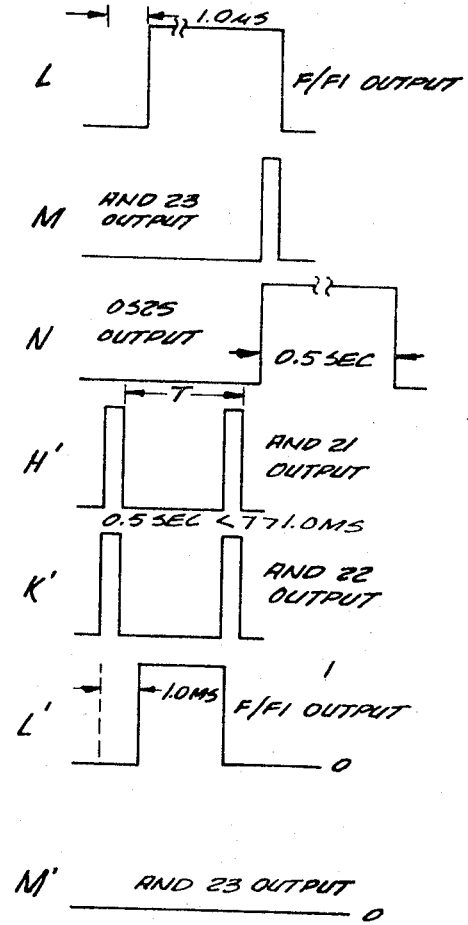
FIG. 6
TIMING DIAGRAM
MEDIUM RANGE
DETECTION SYSTEM

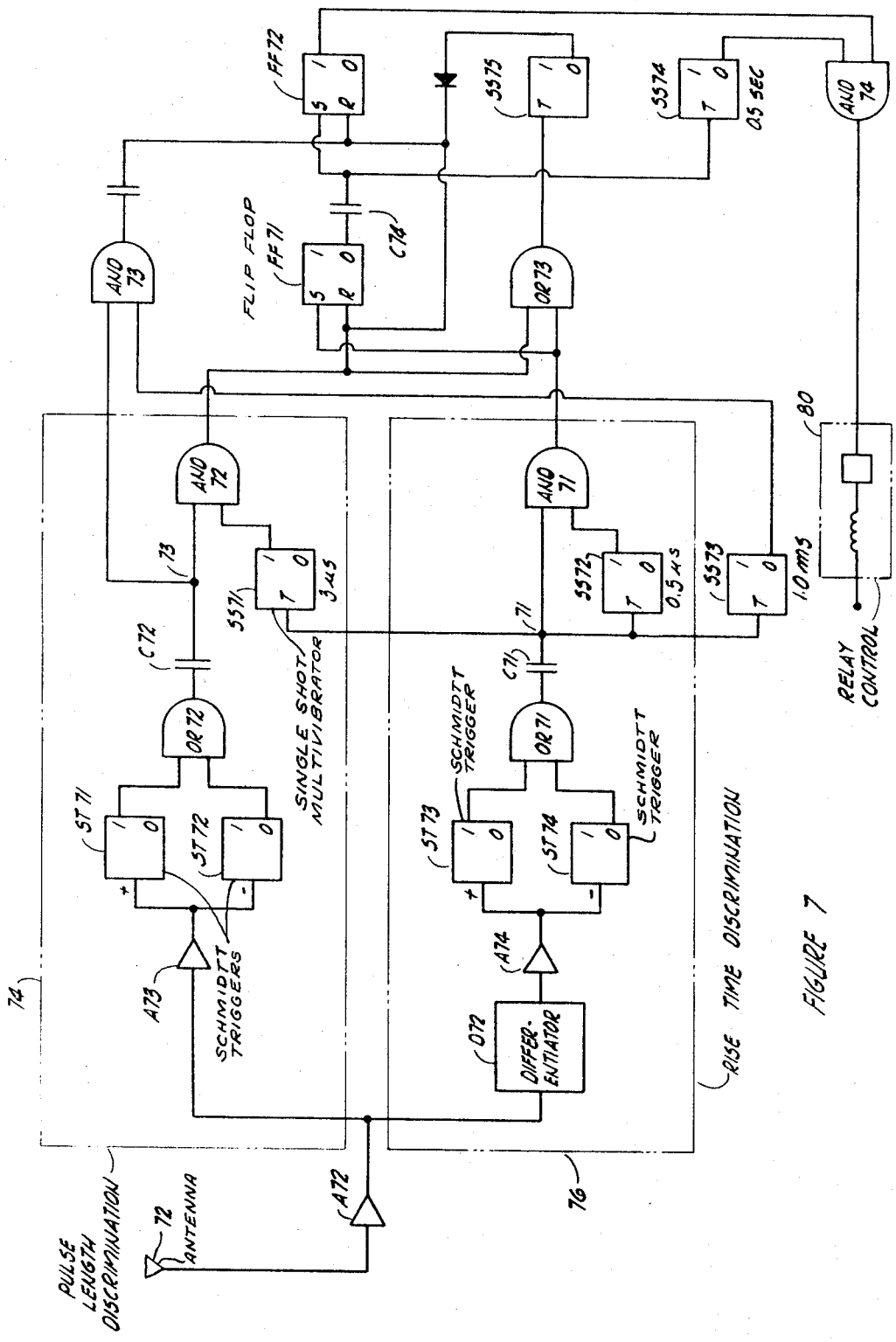

United States Patent Office 3,467,826
Patented Sept. 16, 1969

3,467,826
DETECTION OF ELECTROMAGNETIC RADIATION FROM NUCLEAR EXPLOSIONS
Robert W. Cotterman, Fort Wayne, Ind., assignor to International Telephone and Telegraph Corporation, a corporation of Delaware
Filed Oct. 6, 1964, Ser. No. 401,947
Int. Cl. G01t 1/16
U.S. Cl. 250—83.3     11 Claims

ABSTRACT OF THE DISCLOSURE

Relates to the detection of early electromagnetic radiation engendered by nuclear explosions. In particular, radiation occurring at radio frequencies for periods measured in nanoseconds is detected and proportional control signals are made available for operation of blast-closure devices and remote alarm indicators.

---

The present invention relates to the detection of electromagnetic radiation and particularly to the detection of radiation occurring during a very brief period.

Prior art devices relating to the subject matter of the present invention include devices of use in the early or timely detection, i.e., in the detection before damage is inflicted by the shock wave, of various radiations and disturbances caused by nuclear explosions. It is well known that nuclear explosions generate a "set" of signals starting with the liberation of gamma rays and continuing with a visible flash followed by the formation of a visible fire ball. In conjunction with the foregoing, a radio flash is generated as well as a shock front and, in some cases, a seismic signal. The fire ball, because it may be too late, is not necessarily a timely signal and obviously neither is the air shock wave nor any seismic signals. The gamma radiation is definitely a timely signal, but unfortunately it can be detected only in the immediate vicinity of the weapon. A portion of the visible flash is a timely signal, but inclement weather can severely affect detection range. The radio flash is also a timely signal, but until the present invention, faithful detection of the radio flash without the detection of many other signals was either not successful or required a complex and expensive system.

With past devices it has been particularly difficult to distinguish between wide band signals from nuclear explosions and signals from certain natural occurrences such as those associated with lightening discharges.

It is therefore an object of the present invention to provide for the detection of early electromagnetic radiation from a nuclear blast.

It is a further object of this invention to provide means for detecting electromagnetic radiation having a very sharp rise time and short duration.

It is another object of this invention to provide for the detection of electromagnetic radiation which rises rapidly to a peak level and drops to a zero value and is not similarly repeated in a definable time.

It is yet a further object of this invention to provide for the detection of radiation caused by nuclear explosions while effectively distinguishing against somewhat similar radiation induced by electric storms in the earth's atmosphere.

Further objects and advantages of this invention will be made apparent in the following detailed description of the invention when read in connection with the accompanying drawings, in which:

FIG. 3 is a block diagram showing a short range system for detecting radio signals from a nuclear explosion;

Figure 5:
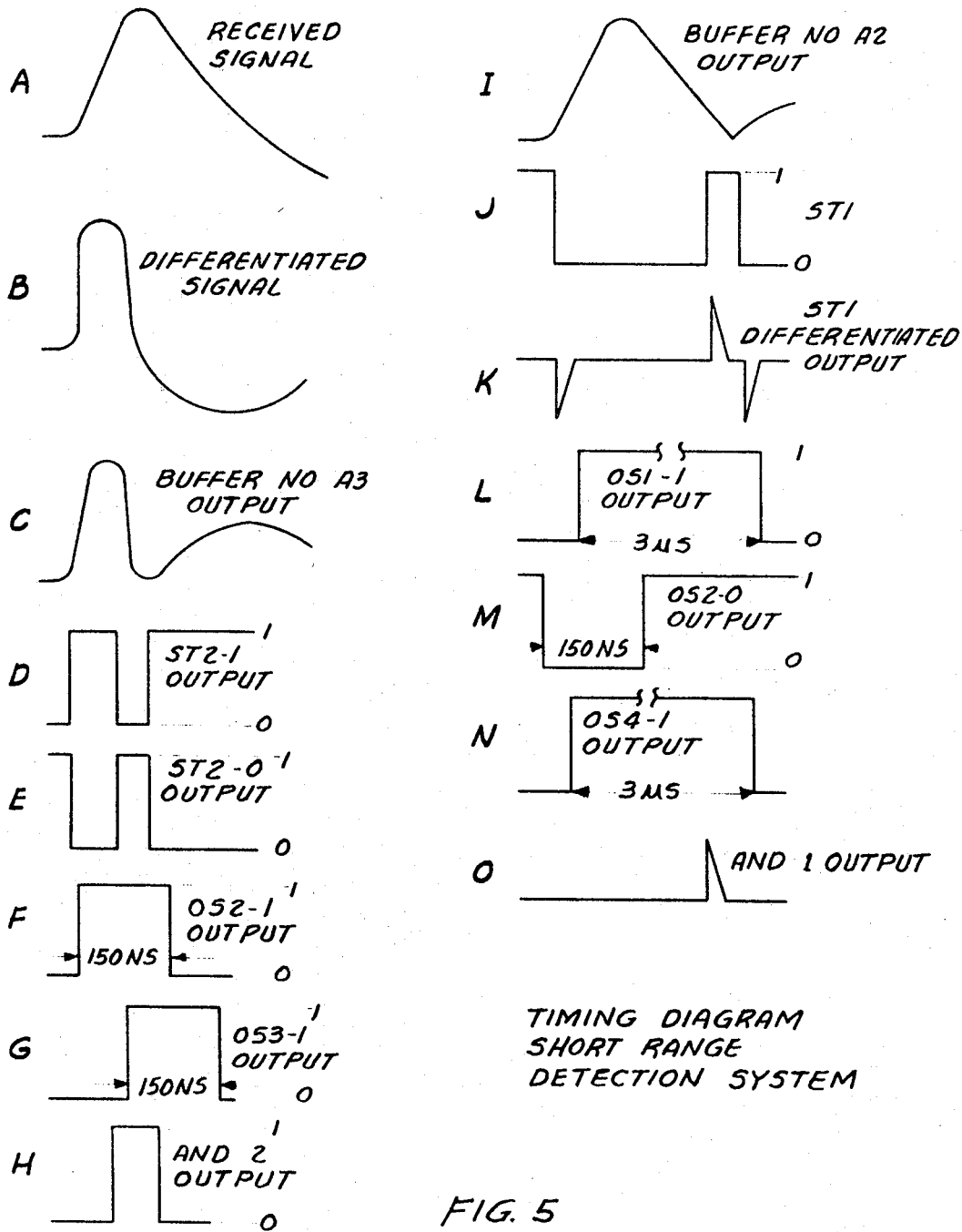

FIG. 5 consists of a number of diagrams of waveforms, in parts A–O, of use in a description of an embodiment of the invention;

FIG. 6 consists of a number of diagrams of waveforms, in parts labeled A–N, H', K', L' and M', to illustrate an embodiment of the invention, and FIG. 7 depicts another embodiment of the invention.

This invention makes use of certain phenomena characteristic of signals radiating from nuclear explosions. Among these is the early rise time of the signals, the very short duration period of the signals, the relatively high energy level of the signals, and the fact that only a single "set" of signals is generated by a nuclear explosion. Embodiments of the invention make use of digital techniques to generate control signals in accordance with whether or not signals received by a suitable antenna have these characteristics.

Before discussing specific embodiments of the invention, a certain amount of background information relating to nuclear explosions appears to be desirable.

Approximately 99.9% of the energy of a fission explosion is liberated in $10 \times 10^{-8}$ seconds (10 shakes or 100 nanoseconds). This energy reacts with the surrounding environment and creates a large amount of gamma and X-ray radiation. This gamma radiation ionizes the surrounding air, thus creating a visible flash and a "radio flash" caused by stripped, high speed electrons. It matters little whether the weapon is detonated in a dense atmosphere or in a vacuum as sufficient material is available in the weapon case and other parts of the weapon.

EARLY TIME RADIO FLASH

Observations have confirmed the existence of a component of the "radio flash" which is much faster than the previously recorded "radio flash" and is also dependent on the magnetic bearing of the observation point with respect to the nuclear explosion.

The generated gamma radiation is propagated outward in all directions and strips electrons from the molecules and atoms of the surrounding media. These electrons are high speed electrons (Compton electrons) with an average energy of 2 mev. In the presence of the earth's magnetic field, the Compton electrons are deflected thereby producing an electric field. Since only those electrons moving perpendicular, or at an angle other than parallel to the magnetic field are deflected, the field pattern generated by a symmetrical weapon burst becomes a solid figure eight; i.e., the same as the pattern of a vertical loop antenna with the antenna plane in the east-west orientation.

Figure 1:
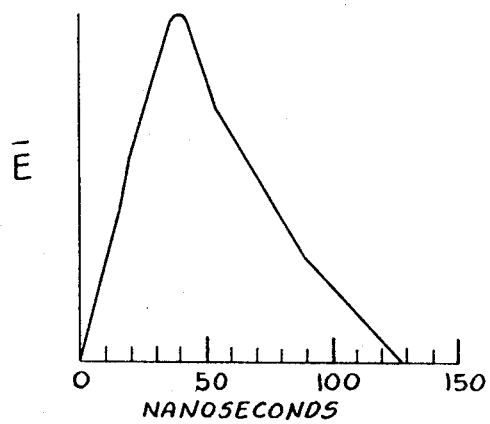
FIG. 1 is a graph depicting an example of the radio flash received by a short stub antenna from a nuclear explosion.

The signal waveshape of the early time radio flash or fast electromagnetic pulse, is shown in FIG. 1. Due to the magnetic bearing relationship, explained above, this pulse will be positive from the east, negative from the west and smaller from the north and south, when received using a small, vertical, stub antenna.

NATURAL SPHERIC SIGNAL

The natural spheric (electromagnetic lightening pulse) is the greatest source of interference for nuclear blast detection systems. As explained previously, the early time or "fast" nuclear signal is a transient signal. The natural spheric is also a transient signal.

Figure 2A:
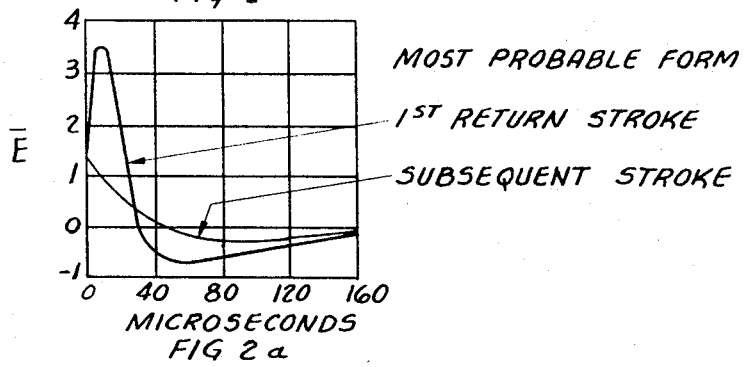
FIGS. 2a and 2b depict the most probable spheric waveforms as received using a short, vertical, stub antenna.
Figure 2B:
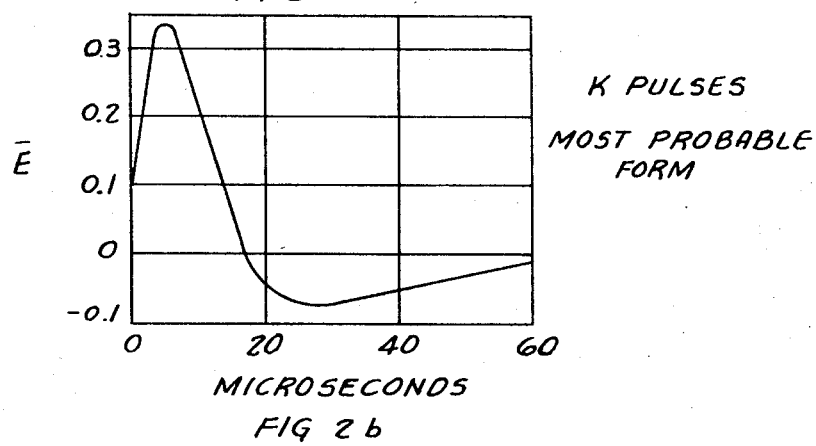

FIGS. 2a and 2b show the most probable spheric waveforms as received using a short, vertical, stub antenna. About 75% of the discharges to earth are multiple strokes, with an average interval between strokes of 50 milliseconds. The leader disturbance is always a series of pulses often spaced so close together that the variation in field is almost continuous. K pulses commonly occur in series, with an interval between pulses of several milliseconds.

Approximately 90% of cloud to earth discharges carry negative charge resulting in signals of the polarity shown in FIG. 2. Cloud-to-cloud discharges are random in polarity, but are characterized by longer pulse times due to the longer discharge path.

RISE TIME DISCRIMINATION

The rise time of the early time pulse is less than 100 nanoseconds as shown in FIG. 1. FIG. 2 shows that the rise time of the most common spheric signals is greater than one microsecond except for the subsequent return strokes. It is also possible that the leader disturbance may have a rise time of less than one microsecond. Neither the subsequent stroke nor the leader disturbance has been investigated in sufficient detail to determine actual rise time.

Rise time criteria can be established in the detection system such that only those signals with a rise time of less than 100 or 150 nanoseconds will be used for further identification.

SIGNAL DURATION DISCRIMINATION

Again, reference to FIGS. 1 and 2 will show that the pulse duration (time to first zero crossover) of the early time nuclear signal is less than the duration of the spheric signal by a factor of at least 100. Thus, pulse duration criteria can be established in the detection system, allowing only those pulses of duration less than 150 nanoseconds to be processed.

REPETITION RATE DISCRIMINATION

A nuclear detonation can be considered a singular event; i.e., one "set" of signals are generated for each explosion. Natural spherics, however, are not singular events. Many types of pulses are generated and often repeated. As an example; a return stroke is always preceded by a leader disturbance and several K pulses occur prior to, or following a return stroke. In addition, the spheric generated signals are spread out over a time period of at least several milliseconds while the radio flash from a nuclear weapon is accomplished in a few hundred microseconds. Discrimination circuits can be made to reject all signals that are repeated within several milliseconds.

SIGNAL AMPLITUDE DISCRIMINATION

For a given range, a nuclear signal generates on the order of a thousand times more signal strength than a spheric. Weapon yield variations affect signal strength, but even small weapons generate a near field of at least 10,000 volts per meter. A very close spheric can generate a greater signal at a receiver than a distant nuclear event, but amplitude discrimination will prevent distant spheric signals from being processed within the detection system.

SHORT RANGE DETECTION SYSTEM

A detection system for use in a hardened, underground structure is required to respond with minimum delay in order to provide the maximum time to complete protective measures. For instance; if a facility were located 1500 feet from ground zero of a one megaton explosion, the shock front would arrive in approximately 150 milliseconds with a peak overpressure of approximately 700 p.s.i. Thus, no delay in the sensor can be allowed as present state-of-the-art blast closure valves operate in approximately 100 milliseconds.

The system shown in FIG. 3 is a short-range protection system; i.e., it provides protection for ranges from essentially ground zero to 30 miles. The basic discrimination techniques employed are signal threshold, pulse rise time and pulse width.

The signal is received via a hardened, vertical stub antenna indicated by the symbol 2 in FIG. 3. From there it is coupled to a low threshold circuit indicated by the dashed lines 4 to a high threshold circuit indicated at 6 and to the nonlinear amplifier A1. The amplifier A1 is of wide dynamic range and supplies signals over two paths, one indicated in part by dashed line 8 for rinse time discrimination and one indicated by dashed line 10 for pulse width discrimination. Bipolar signals may be received, but are converted to unipolar signals through buffer amplifiers A2, A3 and A4.

The low threshold circuit shown in the upper part of FIG. 3 responds to input signals above a selected minimum level set by ST3. A positive output from buffer amplifier A4 is supplied to the Schmitt-trigger ST3. In response to a positive input signal of sufficient amplitude, Schmitt-trigger ST3 provides an enabling signal to the one shot multivibrator OS4 to activate it through its terminal 1. Multivibrator OS4 then supplies an enable signal indicted at FIG. 5N to the "and" gate AND 1 for a period which may be selected as three microseconds.

The signal from amplifier A2 (FIG. 5I) is a positive pulse which activates the Schmitt-trigger ST1 to provide a negative or more nearly zero potential signal from the "0" terminal as indicated in FIG. 5J. This negative signal, or rather the trailing edge of this negative signal is differentiated by the capacitor C2 to provide a pulse in the form of a sharp positive spike (see FIG. 5K) which will pass through the AND 1 gate if the gate has been enabled by signals on its other three terminals. If AND 1 does not have enabling signals present on its other three terminals when the spike from C2 arrives, the spike will not pass and there will be no output signal from AND 1.

The signal from amplifier A1 is differentiated at D2 in the pulse rise time circuit to provide a signal as indicated in FIG. 5B which is proportional to the pulse rise time. This signal is supplied through the buffer amplifier A3, which supplies an output such as is shown in FIG. 5C to set the Schmitt-trigger ST2 at its "one" state. The Schmitt-trigger then supplies positive and negative signals, respectively, as shown in FIG. 5D and FIG. 5E, to the one shot multivibrators OS2 and OS3. One shot multivibrator OS2 is internally connected to be conducting normally through its "0" terminal, but is triggered to provide a positive signal from terminal 1 as shown in FIG. 5F in response to a positive going signal from ST2. One shot multivibrator OS3 is internally connected to be triggered to provide a positive signal from its "1" terminal as shown in FIG. 5G in response to a positive going signal, the positive or rising slope shown in FIG. 5E, from the "0" terminal of ST2. As indicated in FIG. 3, OS2 and OS3 are designed to conduct for 150 ns. once they have been triggered by positive going signals. Consequently, if the signal supplied to Schmitt-trigger ST2 has a duration of less than 150 nanoseconds, OS2 and OS3 will supply signals at their "one" terminals during the same time and the and gate AND 2 will be enabled. Simultaneous occurrence of pulses from OS2 and OS3 are indicated at FIG. 5F and FIG. 5G with conduction of AND 2 in FIG. 5H.

Once AND 2 is enabled, a pulse from it will activate the one shot multivibrator OS1 to supply a "go" signal to AND 1 which will remain conductive for a period determined by OS1. In the example shown, OS1 remains in a "1" conducting state for three microseconds (see FIG. 5L), but other time periods may be chosen depending upon the nature and period of the signals which are expected to be received.

The output signal from the "zero" side of the one shot multivibrator OS2 is negative, as shown in FIG. 5M for 150 nanoseconds following receipt of the trigger signal from ST2. It therefore supplies an inhibit signal to the AND 1 gate which will keep that gate inoperative for 150 nanoseconds. After 150 nanoseconds OS2 will, of course, supply an enabling signal to AND 1.

As previously indicated, the low threshold circuit puts a minimum on the signal level which can be processed. If the signal is above that minimum level, rises to a peak in less than 150 nanoseconds and is less than 3 microseconds in width, the "and" gate AND 1 will be activated to provide a control signal, as shown in FIG. 5, through the amplifier A5 to the "or" gate OR 1 from which a suitable output signal will be supplied.

In case the system is forced to function inside the plasma created by gamma radiation, where the existence of an E field is questionable, the high threshold circuit at 6 of FIG. 3 will be activated to provide an output through OR 1. In the event the antenna is in such a plasma, a high electrostatic potential will exist which will charge the antenna circuit to several thousand volts. This high potential will be supplied through the threshold circuit, which may include a voltage divider, to operate the OR 1 gate directly.

MEDIUM RANGE DETECTION SYSTEM

Figure 4:
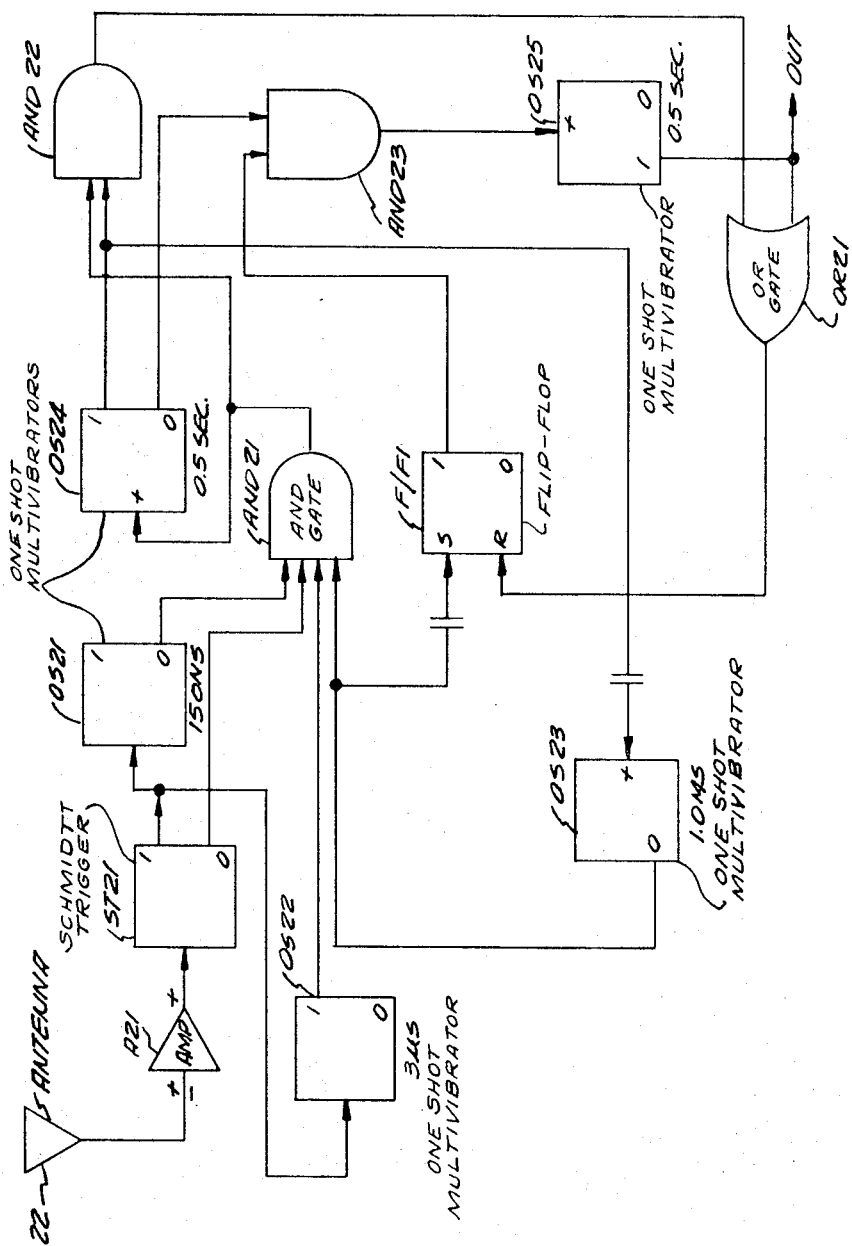
FIG. 4 is a block diagram showing a medium range detection system for detecting radio signals from a nuclear explosion.

Turn now to FIG. 4 for a description of a medium range detecting system which may be defined as a system primarily of use in detecting detonations at distances greater than several miles. The arrival time of the shock front from a one megaton weapon, one mile distance, would be approximately 2.0 seconds and generate 20 p.s.i. overpressure. Since the primary use of medium range systems is to protect above ground semihard structures, protection to this time scale is sufficient as the arrival time of equivalent overpressure from larger weapons is greater. The longer allowable action time of the detection system permits the use of reliable signal repetition rate discrimination.

The system shown in FIG. 4 is a medium range detection system employing pulse width and repetition rate discrimination. This system detects weapon detonations that create only a small overpressure as well as those that create destructive overpressures. The bipolar signal is received via a hardened, vertical stub antenna 22 and converted into unipolar signals, as indicated in FIG. 6B, by the amplifier A21. The unipolar signals are supplied to a Schmitt-trigger ST21 which in response supplies a positive output pulse through its "one" terminal (FIG. 6C) and a negative pulse (FIG. 6D) over its "zero" terminal.

The positive going pulse from the "one" terminal of ST21, such as is shown in FIG. 6C, is supplied to the one shot multivibrator OS21 to produce a negative or inhibit pulse (FIG. 6E) from terminal "zero." This pulse is applied to the and gate AND 21 for 150 nanoseconds to prevent conduction by AND 21. After 150 nanoseconds AND 21 will be more positively biased from OS21 to prepare it for conduction.

The positive going pulse shown in FIG. 6C from the "one" terminal of ST21 is also applied to the one shot multivibrator OS22 to cause it to provide a positive or enable signal (FIG. 6F) at its "one" gate. This enable signal is supplied to the and gate AND 21 to help prepare it for conduction. In the preferred example, OS22 is set to provide a positive pulse for three microseconds thus helping to keep AND 21 in condition to conduct for three microseconds.

Assuming an enabling signal from OS23, which is normally biased to provide such a signal (see FIG. 6G), "and" gate AND 21 will provide an output, if the received signal duration is less than 3 microseconds and over 150 nanoseconds. In this circuit, this means that if the signal ceases after 150 nanoseconds, but before 3 microseconds, a positive output will be supplied from the "0" terminal of ST21 (see FIG. 6D) to enable AND 21. The output of AND 21, shown at FIG. 6H, triggers OS24 which puts out a signal as shown in FIG. 6I to trigger OS23. OS23 inhibits AND 21 for one millisecond (see FIG. 6G) to prevent further weapon signals from passing AND 21 (all but ELF weapon signals are expended in less than one millisecond) and also triggers flip-flop F/F1 at the end of one millisecond. One shot multivibrator OS24 puts out a signal shown in FIG. 6J which inhibits AND 23 for one-half second. OS24 also puts out a signal from its "one" terminal as indicated in FIG. 6I to enable AND 22 for one-half second.

If any other signals are received from antenna 22 between the one millisecond and one-half second period, they pass thru AND 21 as shown in FIG. 6H', through AND 22 to provide an output as indicated in FIG. 6K' which "resets" F/F1 so that it provides a signal of the form indicated at FIG. 6L', and also supplies a signal to AND 23 to provide a zero output as is shown at FIG. 6M'. If no additional signals have been received during the one-half second period, AND 23 is enabled (FIG. 6M), triggering OS25 to provide an output signal (FIG. 6N) and resetting the system to its normal state.

FIG. 7 is a block diagram depicting another embodiment of the invention. In this embodiment, a signal received on antenna 72 is supplied to a nonlinear amplifier A72 having large signal dynamic range capability. The signal from the amplifier A72 is then applied to a pulse length discrimination circuit represented by the dashed line block 74 and to a rise time discrimination circuit represented by the dashed line block 76.

The signal supplied to the rise time discrimination circuit 76 is first differentiated by a conventional differentiator shown in block D72, which thus supplies a signal during a period in which the received signal is rising in amplitude. The signal from D72 is applied through the amplifier A74 to monostable devices represented by Schmitt-triggers at ST73 and ST74. The Schmitt-triggers ST73 and ST74 respond, after a selected threshold level is reached, respectively to a positive and to a negative signal. Thus, while signals are supplied over A74, one or the other of ST73 or ST74 will supply an output signal to activate the OR gate OR 71. The signal from OR 71 will be differentiated by capacitor C71 and applied to the terminal 71 for further distribution.

The signal appearing on terminal 71 triggers a plurality of single shot multivibrators SS71, SS72 and SS73, each of which will then remain in its excited state for a period indicated in FIG. 7 as 3 microseconds, 0.5 microsecond and 1 millisecond, respectively. It should be noted that SS73 conducts through its "zero" terminal to provide an inhibit signal when excited in contrast to SS71 and SS72 which conduct though their "one" terminals to provide enable signals.

In response to signals from terminal 71 and from single shot multivibrator SS72 the AND gate 71 is enabled for a time period limited either by the signal on terminal 71 or for the 0.5 microsecond time period determined by the single shot multivibrator SS72. The rise time discriminator 76 thus established an output signal or control signal, from AND gate 71, for use elsewhere in the circuit only if the rise time is one-half microsecond or less. Signals representing any longer rise time are automatically cut off by removal of the enable signals to the AND gate 71.

The pulse length discrimination circuit 74 receives the signals of interest through an amplifier A73 to activate either of Schmitt-triggers ST71 or ST72, which in turn provide signals through OR gate 72 and capacitor C72 to supply useful signals at a terminal 73. The signals at terminal 73 will generally endure as long as the system is receiving signals over the antenna 72. The signals on terminal 73 will therefore enable the AND gates 72 and 73 while the signals of interest are being received. AND 72 is dependent also upon an enabling signal from the single-shot multivibrator SS71 to cause it to conduct and thereafter will provide an output signal for a period no longer than three microseconds.

The signal from AND 71 triggers the flip-flop FF71 and the signal from AND 72 will then reset the flip-flop FF71.

When it is reset, FF71 delivers a signal through capacitor C74 to trigger the flip-flop FF72 which provides an enable signal to AND gate 74. At the same time, however, the single shot device SS74 is triggered to provide an inhibit pulse to AND gate 74 to prevent it from conducting for one-half second after receipt of the first signal over antenna 72. If no additional signals of the prescribed rise time and pulse duration are received in one-half second, the inhibit signal from SS74 will be removed and the AND gate 74 will be enabled by FF72 to pass a signal to activate a relay control 80. If another signal capable of passing the discriminators 74 and 76 is received within one-half second, and after one millisecond, it will pass through AND 73 to reset FF72 and remove the enable signal from AND 74 so that no output from AND 74 will occur.

The single shot multivibrator SS73, upon receipt of a signal from terminal 71, will provide an inhibit signal to AND 73 for one millisecond. This inhibit signal is intended to prevent a VLF signal which follows the early time signal from passing through AND 73. The inhibit signal also prevents sky wave signals from interfering with the operation of the system.

In this manner, only one event occurring within the one-half second time interval, except for the one millisecond blank time, can produce a control signal from AND 74. If more than one event occurs, as would be the case for a spheric, no control signal from AND 74 will be provided.

The single shot multivibrator SS75 is adjusted to provide an automatic system reset signal after the one-half second period.

While the principles of the invention have been described above in connection with specific apparatus and applications, it is to be understood that this description is made only by way of example and not as a limitation on the scope of the invention.

What is claimed is:

1. A radiation detector for detecting radio frequency signals emanating from the first stages of a nuclear explosion comprising:
    means responsive to radio signals including an antenna for providing an output signal during the time in which the radio signals are received;
    means for providing a control signal in response to said output signal;
    gating means;
    means for applying said control signal to enable said gating means;
    means for providing inhibit signals when said received radio signals have a time duration longer than an acceptable time period, where said time period corresponds to the time during which radio signals are liberated immediately following a nuclear explosion; and
    means for applying said inhibit signals to said gating means to prevent said gating means from conducting when the duration of said radio signals is longer than said acceptable time period.

2. An electromagnetic radiation detector for detecting radio frequency signals emanating from the first stages of a nuclear explosion comprising:
    means responsive to radio frequency signals including means for providing an output signal during the time in which radio frequency signals are received;
    means for providing a control signal in response to said output signal;
    gating means;
    means for applying said control signal to said gating means;
    means for generating an additional control signal when said received radio frequency signals have a time duration of acceptable length; and
    means for applying said additional control signal to said gating means;
    said gating means responding to the simultaneous application of said control signal and said additional control signal to generate a further signal indicating that the received radio frequency signals have desired characteristics.

3. A radiation detector substantially as claimed in claim 1, in which:
    said means for providing an output signal during the time in which radio signals are received comprises a monostable device.

4. A radiation detector substantially as claimed in claim 3, in which:
    said means for providing inhibit signals during the time said radio signals are received comprises a monostable device.

5. An electromagnetic radiation detector for detecting radio frequency signals emanating from the first stages of a numlear explosion comprising:
    means for providing a first output signal when the rise time of received radio signals is shorter than a certain period;
    means for providing a second output signal when the duration of received radio signals is less than a particular time period; and
    means responsive to said first output signal and said second output signal to provide a third output signal indicative that said received radio signals have a rise time shorter than a specific value and a time duration of less than a certain length.

6. An electromagnetic radiation detector substantially as claimed in claim 5 in which the rise time of interest is about 100 nanoseconds and the pulse duration period is less than 3 microseconds.

7. An electromagnetic radiation detector for detecting radio frequency signals emanating from the first stages of a nuclear explosion comprising:
    means for providing a first output signal when the magnitude of received radio frequency signals exceeds a certain minimum threshold level;
    means for providing a second output signal when the rise time of received radio frequency signals is shorter than a preselected time period;
    means for providing a third output signal when the duration of received radio frequency signals is shorter than a preselected time period; and
    means responsive to said first, second and third output signals to provide a system output signal indicating that said received radio frequency signals have a threshold level above a certain minimum, a rise time shorter than a preselected value and a duration less than a preselected time period.

8. In an electromagnetic radiation detector substantially as claimed in claim 7,
    said means for providing said first output signal comprising a monostable multivibrator and a one-shot multivibrator.

9. An electromagnetic radiation detector substantially as claimed in claim 8, in which:
    said means for providing a third output signal comprises a monostable device operable from the time the received signals start until they stop and a differentiator in series to provide a pulse as said signals decay.

10. An electromagnetic radiation detector substantially as claimed in claim 7, in which:
    said means for providing said second output signal comprises a differentiator for providing a signal representative of pulse rise time, a monostable device responsive to said pulse rise time signal to provide triggering signals, and first and second one shot multivibrators responsive to said triggering signals to provide control signals to activate an "AND" gate and thereby provide said second signal.

11. A radiation detector for detecting radio frequency signals emanating from the first stages of a nuclear explosion comprising:
- means for providing a control signal when the time duration of received radio signals is within certain limits set by the rise time, time duration and amplitude of radiation liberated immediately following a nuclear explosion; and
- means for preventing said control signal from progressing through a gate when additional radio signals are received within a particular time period.

References Cited

UNITED STATES PATENTS

| | | |
|---|---|---|
| 3,147,380 | 9/1964 | Buckingham et al. |
| 3,254,219 | 5/1966 | Finlay et al. _____ 250—83 X |

RALPH G. NILSON, Primary Examiner

A. B. CROFT, Assistant Examiner

U.S. Cl. X.R.

328—108